(12) United States Patent
Yu et al.

(10) Patent No.: US 8,879,786 B2
(45) Date of Patent: Nov. 4, 2014

(54) METHOD FOR DETECTING AND/OR TRACKING OBJECTS IN MOTION IN A SCENE UNDER SURVEILLANCE THAT HAS INTERFERING FACTORS; APPARATUS; AND COMPUTER PROGRAM

(75) Inventors: Jie Yu, Hildesheim (DE); Julia Ebling, Hildesheim (DE); Hartmut Loos, Hildesheim (DE)

(73) Assignee: Robert Bosch GmbH, Stuttgart (DE)

( * ) Notice: Subject to any disclaimer, the term of this patent is extended or adjusted under 35 U.S.C. 154(b) by 1350 days.

(21) Appl. No.: 12/202,556

(22) Filed: Sep. 2, 2008

(65) Prior Publication Data
US 2009/0060276 A1   Mar. 5, 2009

(30) Foreign Application Priority Data
Sep. 4, 2007   (DE) .......... 10 2007 041 893

(51) Int. Cl.
   *G06K 9/00*   (2006.01)
   *G08B 13/196*   (2006.01)
(52) U.S. Cl.
   CPC ...... *G06K 9/00771* (2013.01); *G08B 13/19608* (2013.01); *G08B 13/19606* (2013.01)
   USPC ........................................................ 382/103
(58) Field of Classification Search
   USPC ........................................................ 382/103
   See application file for complete search history.

(56) References Cited

U.S. PATENT DOCUMENTS

| | | | |
|---|---|---|---|
| 6,985,172 B1 | 1/2006 | Rigney et al. | |
| 7,130,468 B1 | 10/2006 | Meyer et al. | |
| 2005/0128298 A1 | 6/2005 | Rottmann | |
| 2005/0146605 A1 | 7/2005 | Lipton et al. | |
| 2005/0275723 A1 | 12/2005 | Sablak et al. | |
| 2008/0019566 A1* | 1/2008 | Niem et al. | 382/103 |

FOREIGN PATENT DOCUMENTS

| | | |
|---|---|---|
| DE | 199 32 662 | 1/2001 |
| DE | 102 10 926 | 10/2003 |
| EP | 1 631 073 | 3/2006 |
| WO | 2006/104903 | 10/2006 |

OTHER PUBLICATIONS

Alan J. Lipton, Local Application of Optic Flow to Analyse Rigid versus Non-Rigid Motion, Carnegie Mellon 1999.*

* cited by examiner

*Primary Examiner* — Chan Park
*Assistant Examiner* — Mark Roz
(74) *Attorney, Agent, or Firm* — Michael J. Striker

(57) ABSTRACT

A method for detection and/or tracking of objects in motion 16 in a scene under surveillance 15, in which besides the objects in motion 16, interfering objects and/or interfering regions—both hereinafter called interfering factors 17, 23—can occur, is proposed, in which the scene under surveillance 15, a plurality of regions are defined that are divided up into various region classes; and a first region class D1, 5 includes sensitive regions, in which no and/or only insignificant interfering factors 17, 23 are located and/or are to be expected; and for detection and/or tracking of the objects in motion 16 in the sensitive regions, a sensitive content analysis is performed, and a second region class D2, 6 includes semi-sensitive regions 19, in which interfering factors 17, 23 are located and/or are to be expected, and for detection and/or tracking of the objects in motion 16 in the semi-sensitive regions 19, a semi-sensitive content analysis is performed, which is limited and/or modified compared to the sensitive content analysis.

16 Claims, 4 Drawing Sheets

METHOD FOR DETECTING AND/OR TRACKING OBJECTS IN MOTION IN A SCENE UNDER SURVEILLANCE THAT HAS INTERFERING FACTORS; APPARATUS; AND COMPUTER PROGRAM

CROSS-REFERENCE TO A RELATED APPLICATION

The invention described and claimed hereinbelow is also described in German Patent Application DE 10 2007 041 893.2 filed on Sep. 4, 2007. This German Patent Application, subject matter of which is incorporated herein by reference, provides the basis for a claim of priority of invention under 35 U.S.C. 119(a)-(d).

BACKGROUND OF THE INVENTION

The invention relates to a method for detection and/or tracking of objects in motion in a scene under surveillance, in which besides the objects in motion, interfering objects and/or interfering regions—hereinafter called interfering factors—can occur, in which the scene under surveillance, a plurality of regions are defined that are divided up into various region classes; a first region class includes sensitive regions, in which no and/or only insignificant interfering factors are located and/or are to be expected; and for detection and/or tracking of the objects in motion in the sensitive regions, a sensitive content analysis is performed. The invention also relates to an apparatus, which is embodied for performing the aforementioned method, and to a corresponding computer program.

Video surveillance systems typically include a plurality of surveillance cameras and are used for monitoring public or commercial areas. Examples of such video surveillance systems can be found in railroad stations, airports, factories, schools, universities, prisons, hospitals, and so forth. Often, the image data streams furnished by the surveillance cameras are no longer manually watched by surveillance personnel; instead, algorithms for content analysis of the image data streams are employed, so as to detect relevant incidents automatically and trip alarms as needed. Compared to the use of surveillance personnel, this automated procedure has the advantage of considerable savings on labor costs, and furthermore, the surveillance is independent of the current state (fatigue, and so forth) of the observer.

For automatic evaluation of the image data streams, it is a widely employed principle to separate objects in motion from the (essentially static) scene background (this is known as object segmentation), to track them over time (known as tracking), and to trip an alarm if relevant motions occur. Often, the image distinctions between a current camera image and a so-called scene reference image which models the static scene background are evaluated for the object segmentation.

Such video surveillance systems and automatic evaluations are known for instance from published German Patent Application DE 199 32 662 A1 or published German Patent Application DE 102 10 926 A1, which form the general prior art.

SUMMARY OF THE INVENTION

Preferred or advantageous embodiments of the invention will become apparent from the dependent claims, the ensuing description, and the accompanying drawings.

Within the scope of the invention, an image-based method for detection and/or tracking of objects in motion in a scene under surveillance is disclosed, which is preferably implemented by means of digital image processing. In this context, the detection includes the initial recognition of the objects in motion, and tracking includes the re-recognition of the objects in motion in subsequent images in the scene under surveillance. The method is embodied for detecting and tracking one or more objects in motion.

The scene under surveillance is preferably observed via surveillance cameras that output video sequences, which are then processed in the context of the method. In the scene under surveillance, the objects in motion can occur on the one hand, but on the other, interfering objects and/or interfering regions can also be located in the scene under surveillance, especially in the foreground and/or background of the scene. For the sake of simpler description, the interfering objects and interfering regions will hereinafter both be called interfering factors.

Within the scope of the method, a plurality of regions are defined in the scene under surveillance, which can have an arbitrary shape, such as round, rectangular, or square, and which may either be nonoverlapping or overlapping. Regions are defined as image sections in the scene under surveillance that over a surveillance period are preferably stationary.

The regions are divided up into various region classes; a first region class includes sensitive regions, in which no and/or or only insignificant interfering factors are located and/or are to be expected. The division into the region classes can be done for instance manually by a user and/or in automated fashion by means of a first, for instance image-based, content analysis of the scene under surveillance. In the sensitive regions, a sensitive content analysis, in particular a video content analysis, is performed for detection and/or tracking of the objects in motion. The sensitive content analysis for instance includes the steps of forming or taking on a scene reference image, segmentation of objects, and detection and/or tracking of the segmented objects over time.

According to the invention, it is proposed that a second region class be used, in which semi-sensitive regions are classified and/or can be classified; in the semi-sensitive regions, in particular stationary and/or constant interfering factors are located and/or are to be expected. For detection and/or tracking of the objects in motion in the semi-sensitive regions, a semi-sensitive content analysis is performed, which with a view to the image processing algorithms employed is limited and/or modified compared to the sensitive content analysis.

One concept of the invention is that the known image processing algorithms for detection and/or tracking of objects in motion, particularly in the scope of separating the objects in motion from a scene reference image, function properly as long as there is a simple background of the scene and/or a scene under surveillance that is largely uninterfered with. However, the usual procedure becomes critical in actual scenes under surveillance, in which interfering regions and/or interfering objects can occur, such as trees, branches or hedges that move in the wind, but also a road with heavy traffic, on which the objects in motion can no longer be separated from one another or from the scene background without making mistakes.

As also addressed in a preferred embodiment of the invention, it is possible to mark such interfering regions as insensitive in the scene under surveillance and to exclude them from an content analysis, so that in practice, these insensitive regions are blind spots in the video surveillance.

Conversely, according to the invention, it is proposed that such insensitive regions be supplemented and/or replaced with semi-sensitive regions, and in the semi-sensitive regions, at least a limited content analysis of the scene under surveillance is performed. On the one hand, it is possible to implement this limited content analysis by using simplified image processing algorithms; on the other, it is possible for information about the objects in motion that has been acquired in the sensitive regions to be used further in the semi-sensitive regions and in this way to support the detection and/or tracking of the objects in motion in the semi-sensitive regions by information transfer. Although with this procedure, areas that are still hard to detect remain in the video surveillance, nevertheless, regions that are embodied as blind spots are precluded or at least minimized.

In a preferred refinement of the invention, the regions are optionally divided up into a third region class, which includes insensitive regions in which interfering factors are for instance located, and in the insensitive regions, no content analysis for detection and/or tracking of the objects in motion is performed. In this preferred refinement of the invention, the plurality of regions in the scene under surveillance are thus divided up into precisely three region classes, namely having sensitive, semi-sensitive, and insensitive regions. In a further embodiment of the invention, a plurality of semi-sensitive region classes are provided, and the various half-sensitive region classes differ in the type of content analysis.

In one possible implementation of the invention, the detection and/or tracking of the objects in motion is effected in the semi-sensitive regions independently in terms of data from the detection and/or tracking of the objects in motion in the sensitive regions.

In a variant embodiment of this implementation, objects in motion are detected and/or tracked in that an unconventional pattern of motion compared to the semi-sensitive region is ascertained. One example of an unconventional pattern of motion is when an object in the semi-sensitive region is moving within this semi-sensitive region counter to a general direction of motion. This situation occurs in practice for instance when a person or a vehicle is moving counter to a general walking or travel direction. Another example of an unconventional pattern of motion is when an object in the semi-sensitive region is moving with a directional motion, while conversely, otherwise only nondirectional motions are detectable in this semi-sensitive region. A further variant alternative is when patterns of motion of objects are compared with predefined patterns of motion, and if they agree, these objects are detected and/or tracked as objects in motion.

In a preferred implementation, the patterns of motion are detected by the analysis of the optical flow in the semi-sensitive regions. The optical flow preferentially designates a vector field that indicates the 2D direction of motion and 2D speed for pixels or image regions in an image sequence.

An advantageous alternative or supplement to the foregoing provisions exists when in the semi-sensitive regions, the objects in motion are detected and/or tracked via a comparison of characteristics. The characteristics of the objects in motion are compared with characteristics of reference objects, which are stored for instance in a reference database and can for instance be selected by a user. Examples of possible characteristics are so-called SIFT (Scale-Invariant Feature Transform) characteristics, CDOF characteristics, KLT characteristics, or mean-shift characteristics.

In a further alternative or supplement to the invention, the objects in motion in the semi-sensitive regions are detected and/or tracked with the aid of motion and/or object and/or characteristic information that are detected in the sensitive regions. For example, the detection or tracking of a moving object is continued further, if the moving object is moving from a sensitive region into a semi-sensitive region. The further tracking is reinforced by the fact that the object, motion, and/or characteristic information on the moving object that has been ascertained in the sensitive region is used for further tracking inside the semi-sensitive regions. As an alternative to this, for objects in motion that have already occurred at a different place in a scene under surveillance, especially involving the same camera or the same camera network, characteristics are calculated and stored in memory, and by comparison of these stored characteristics with characteristics of objects in semi-sensitive regions, the objects in motion in the semi-sensitive regions can be re-recognized, and detection and/or further tracking of these objects in motion can be done.

A further subject of the invention is an apparatus having the characteristics of claim 10, which is embodied and/or suited in particular for performing the method just described, and the apparatus receives image sequences of a scene under surveillance, and in the scene under surveillance, besides one or more objects in motion, interfering objects and/or interfering regions—both hereinafter called interfering factors—can occur.

The apparatus has a classification module, which is embodied for defining regions in the scene under surveillance and dividing up the regions into various region classes. A first region class pertains to sensitive regions, in which no and/or only insignificant interfering factors are located and/or are to be expected; a second region class pertains to semi-sensitive regions, in which interfering factors are located and/or are to be expected. The apparatus has at least a first and a second analysis module; the first analysis module is embodied for performing a sensitive content analysis for detection and/or tracking of the objects in motion in the sensitive regions, and the second analysis module is embodied for performing a semi-sensitive content analysis in the semi-sensitive regions, the semi-sensitive content analysis being limited and/or modified compared to the sensitive content analysis. The content analysis is embodied in particular as video content analysis (VCA) and is preferably done via digital image processing.

DESCRIPTION OF THE PREFERRED EMBODIMENTS

Figure 1:
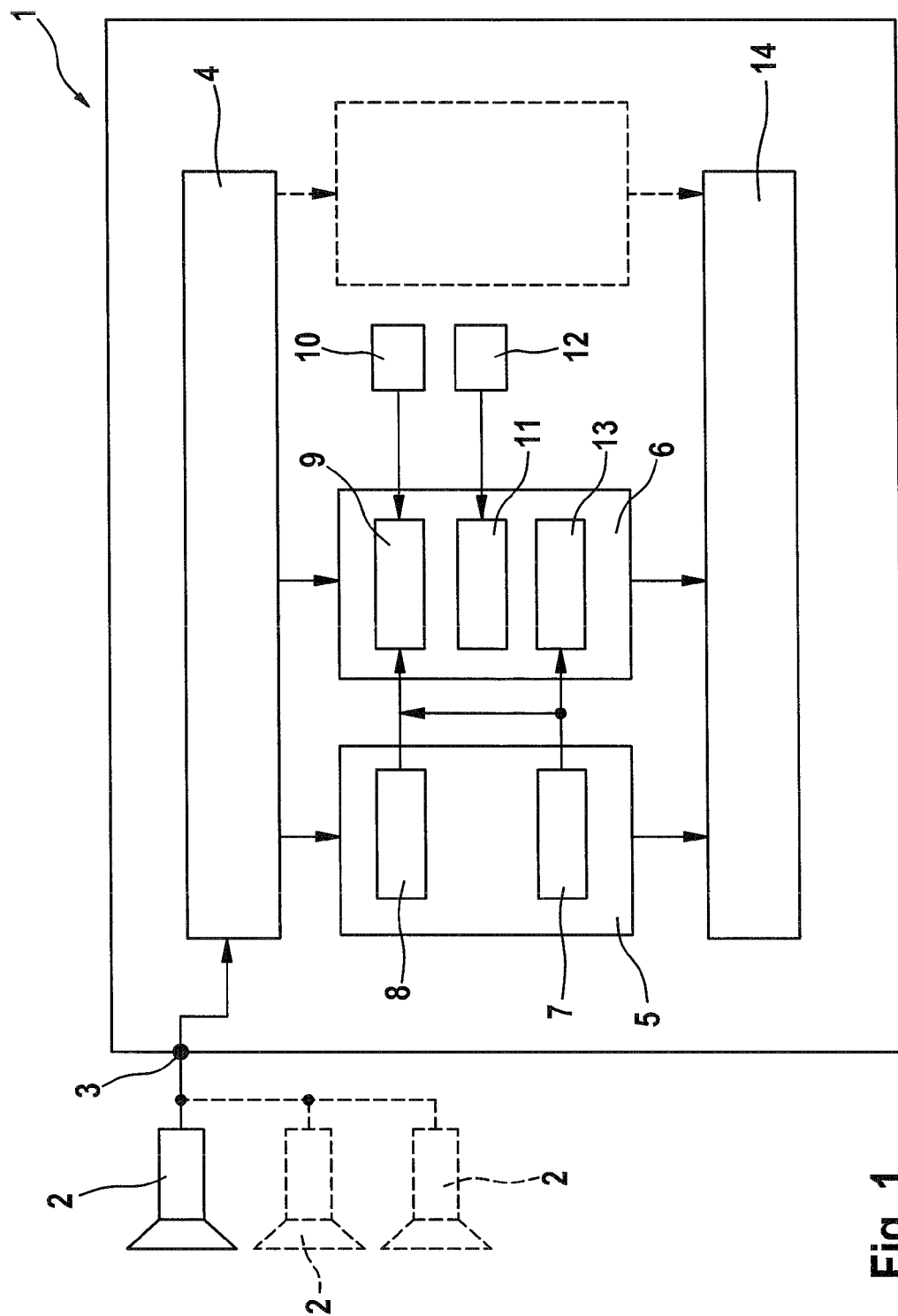
FIG. 1 is a block diagram of an apparatus, as a first exemplary embodiment of the invention.

Components in the drawings that correspond to one another or are the same are identified by corresponding or identical reference numerals throughout.

FIG. 1, in a schematic block diagram, shows an apparatus 1 for detection and/or tracking of objects in motion in a scene under surveillance that is recorded by way of one or more surveillance cameras 2. The surveillance cameras 2 may be components of a camera network that observe a complex or branching scene under surveillance.

The image data streams from the surveillance cameras 2 are transferred via an interface 3 to a classification module 4, which is embodied for defining a plurality of regions in the scene under surveillance, or in the reproduction of the scene under surveillance. These regions can in their entirety cover the entire scene under surveillance; in alternative embodiments, it is also possible for only a portion of the scene under surveillance to be covered by the regions. Moreover, the regions may be overlapping, or in other alternative embodiments they may be positioned without overlaps.

In a next step, in the classification module 4, region classes are assigned to the regions; a first region class pertains to so-called sensitive regions, in which no interfering regions or interfering objects—both hereinafter called interfering factors—or only a negligible number of them are located. In these sensitive regions—despite the possible existence of a few interfering factors—an content analysis is possible, for instance via object segmentation and object tracking. A second region class pertains to semi-sensitive regions, in which at least some interfering factors are located or to be expected. In the semi-sensitive regions, the conventional image processing algorithms, of the kind used in the sensitive regions, often lead to erroneous results or even complete failure. In order nevertheless to be able to draw information from the semi-sensitive regions, in these regions a modified and/or limited content analysis is performed, as will be described hereinafter. Further, optional region classes can involve insensitive regions, in which content analyses, even if their scope is reduced, still do not produce a usable result.

After the classification of the various regions into the region classes, the regions are transferred to a first analysis module 5, a second analysis module 6, and optionally further analysis modules, indicated by dashed lines in FIG. 1; the first analysis module 5 is embodied and/or located for analyzing the sensitive regions by means of a sensitive content analysis. The second analysis module 6 is conversely embodied and/or located for performing a semi-sensitive content analysis in the region of the semi-sensitive regions, the semi-sensitive content analysis being modified and/or limited compared to the sensitive content analysis.

The first analysis module 5 has a tracking block 7, which is embodied for implementing an image processing algorithm in order to detect and/or track a moving object in the sensitive regions. For instance, within the scope of the image processing algorithm, a scene reference image or a scene reference model is formed of the scene under surveillance, or only of the sensitive regions. In operation, a current camera image from the surveillance camera 2 is compared with the scene reference image, and the differences are classified as moving image regions. These moving image regions are segmented into objects and tracked over time via the chronologically successive images in the image sequences of the surveillance cameras. Alternative, still other algorithms can be used for object detection or tracking.

Alternatively or in addition, a characteristic function block 8 can be provided, which detects and/or tracks the objects in motion by means of a comparison of specific characteristics (mean-shift, CDOF, SIFT, and/or KLT characteristics).

The second analysis module 6 optionally includes a characteristic comparison block 9, which is embodied for detecting predetermined characteristics of an object, and thus of one or more of the objects in motion, in the semi-sensitive regions and/or tracking them over time. Predetermining the characteristics to be detected is done for instance by the tracking block 7, and characteristics of a moving object already detected in the scene under surveillance are transferred to the characteristic comparison block 9 by the characteristic function block 8. As a further option, the characteristics are read out from a characteristic data memory 10, in which characteristics of different types or species of objects in motion are stored in memory. The selection and specification of the moving object to be sought is done preferably via the user.

In addition, the second analysis module 6 can have a flow module 11, which calculates and evaluates the optical flow in the semi-sensitive regions. On the one hand, the flow module 11 can evaluate the calculated optical flow in accordance with a set of guidelines; for instance, objects that are moving counter to the otherwise optical flow in the semi-sensitive regions are detected, or objects with a directional motion are detected in a semi-sensitive region in which otherwise only non-directional patterns of motion can be found. On the other hand, patterns of motion can be predetermined by a user from a pattern memory 12; by a comparison of the patterns of motion, a moving object is detected and/or tracked.

As a further option, the second analysis module 6 has a tracking block 13, which in contrast to the tracking block 7, to simplify the tracking thereof, receives a starting position and/or a starting direction of motion of the moving object to be tracked.

The results of the analysis modules 5 and 6 are collected and assessed in an evaluation module 14. As a function of predeterminable rules, response reactions, such as alarms, announcements, or the like, are tripped.

Figure 2:
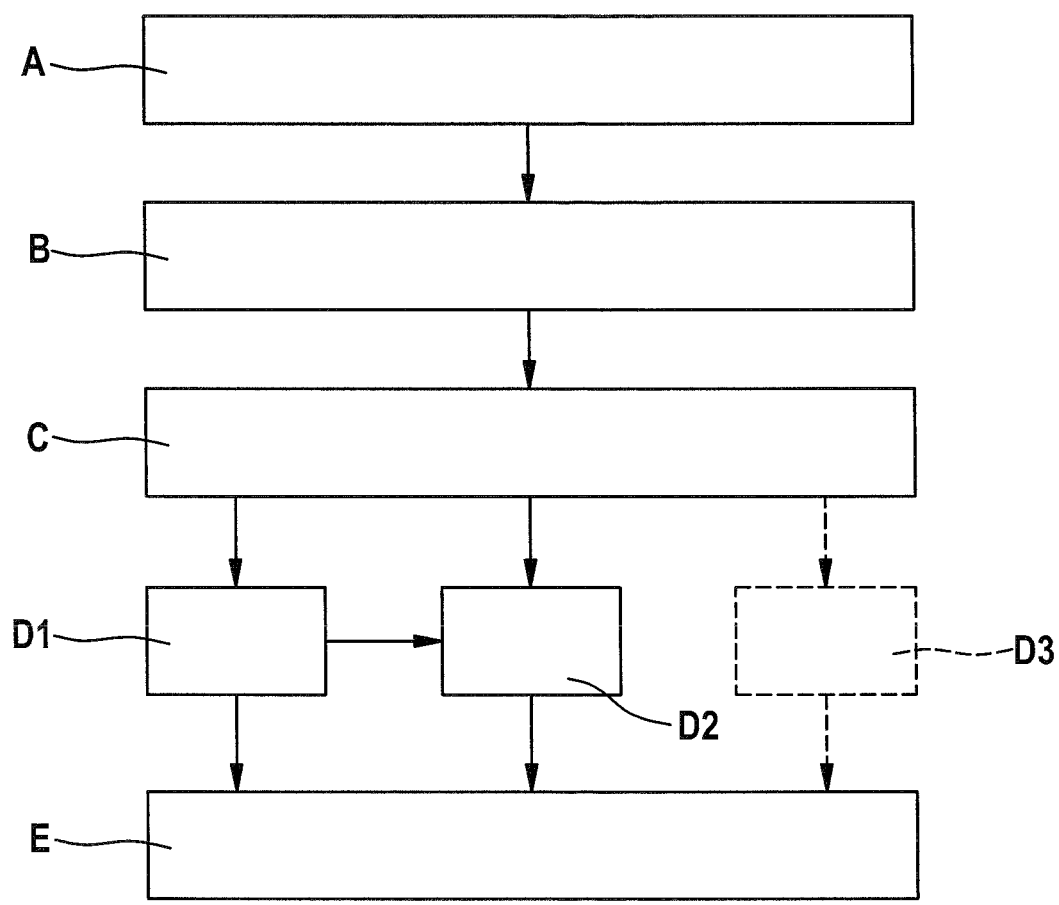
FIG. 2 is a flow chart of a method, as a further exemplary embodiment of the invention.

FIG. 2, in a flow chart, shows one exemplary embodiment of the method of the invention, which is performed in the apparatus of FIG. 1; in a first step A, the image sequences of the surveillance camera 2 are received. In a step B, various regions in the scene under surveillance are defined either manually or automatically. In a step C, the defined regions are classified in region classes; a first region class pertains to sensitive regions, a second region class pertains to semi-sensitive regions, and—optionally—a third region class pertains to insensitive regions. In a next step D1, D2 and D3, respectively, the various regions are evaluated with the aid of the analysis modules 5 and 6; object, motion and/or characteristic information about objects in motion is transferred from the first analysis module 5 to the second analysis module 6. Once the object detection and tracking have been done in steps D1 through D3, the results are combined in a step E and the response reactions are tripped.

Figure 3A:
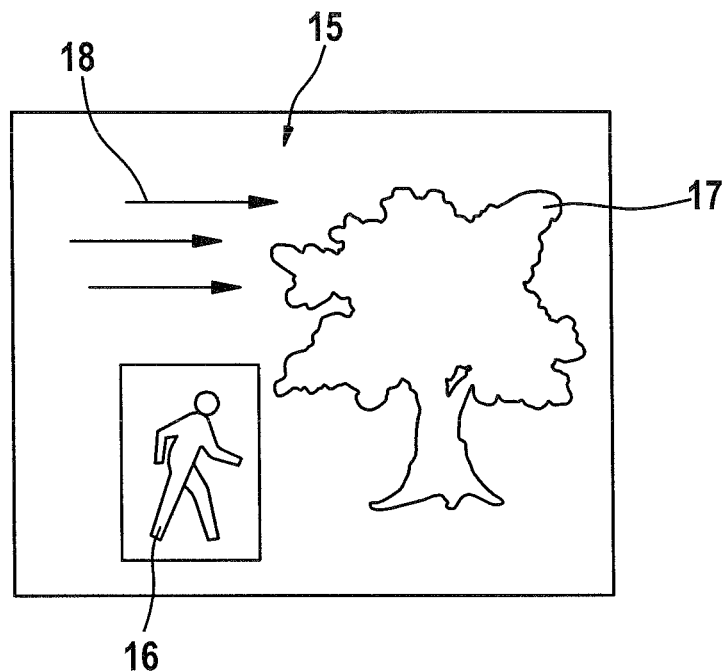
FIGS. 3a and 3b show a first example of a scene to illustrate the mode of operation of the exemplary embodiments of the invention.
Figure 3B:
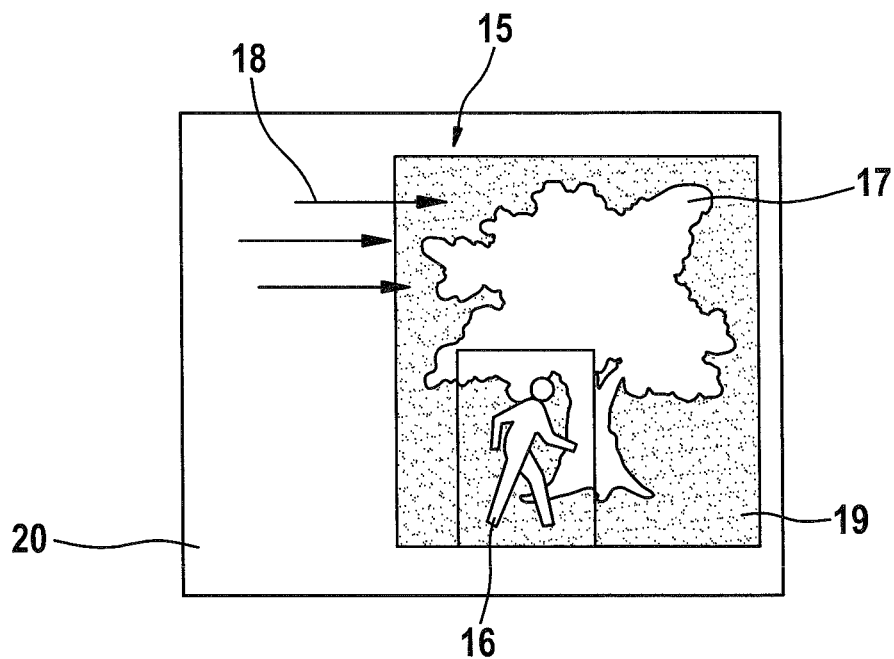

FIGS. 3a and 3b show a first exemplary embodiment of the invention, in which a scene under surveillance 15 is shown, in which a person 16 is shown as an example of a moving object and tree 17 subjected to wind 18 is shown as an example of an interfering factor. Typically, it is difficult to detect and/or track the person 16 in the vicinity of the interfering factor 17, since some parts of the interfering factor 17 are assessed as a moving object, and the person 16 moving past coalesces with the interfering factor 17. Within the scope of the invention, the vicinity are the interfering factor 17 is classified as a semi-sensitive region 19, and the remaining area of the scene under surveillance 15 is marked as a sensitive region 20. While a sensitive content analysis is performed in the sensitive region 20, in the semi-sensitive region 19 interference is suppressed by means of image processing algorithms, and objects that have already been detected, such as the person 16, continue to be tracked with different image processing algorithms from those in the sensitive region 20.

Figure 4A:
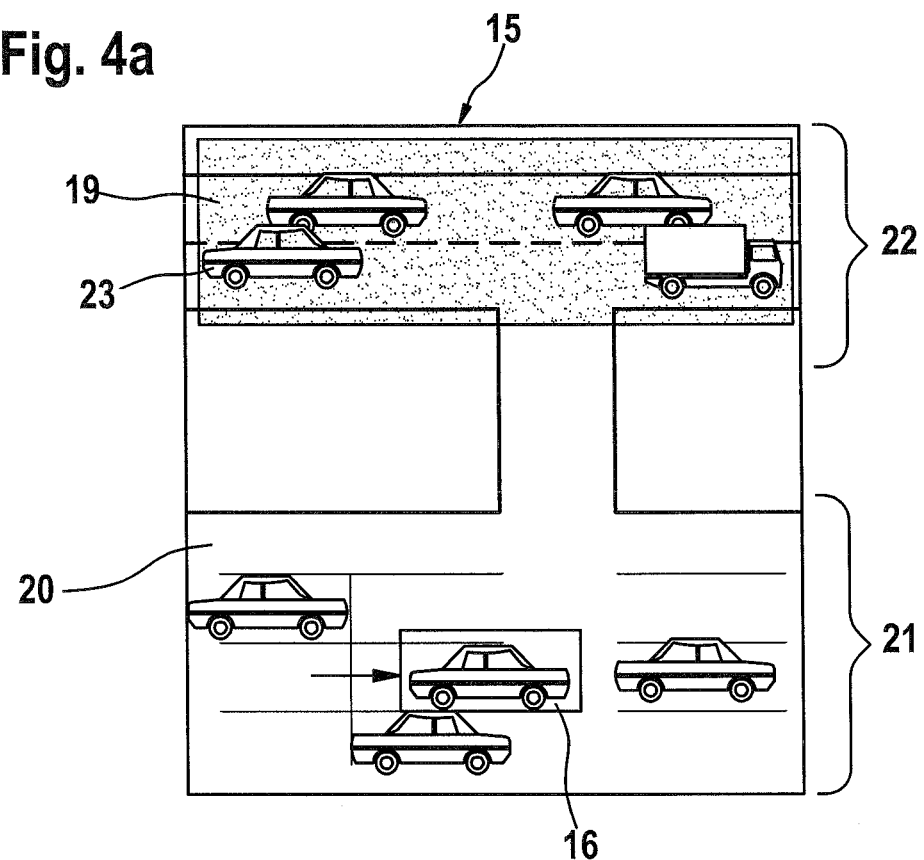
FIGS. 4a and 4b show a second example of a scene to illustrate the mode of operation of the exemplary embodiments of the invention.
Figure 4B:
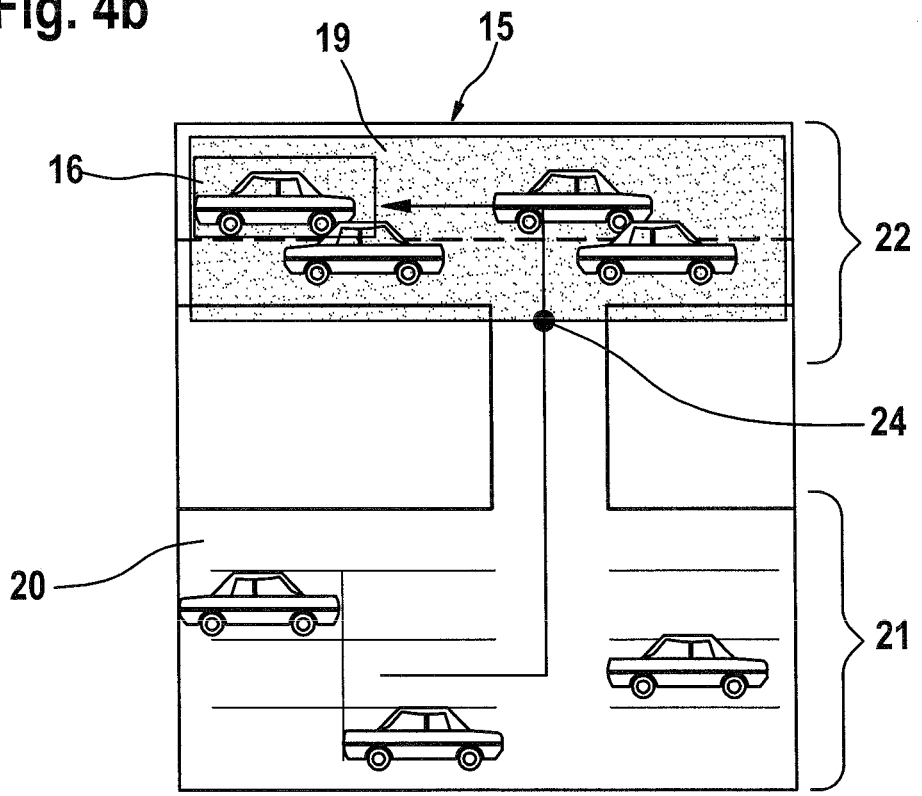

FIGS. 4a and 4b show a second example of a scene, as a further exemplary embodiment of the invention, in which the scene under surveillance 15 shows a parking area 21 and a street area 22. In the street area 22, cars 23 temporarily move so close together that they can no longer be reliably separated from one another in the image processing. By setting one semi-sensitive region 19 and one sensitive region 20, the sensitive content analysis is performed only in the region of the parking area 21, but not in the street area 22. However, an object 16, in this case a vehicle, which is detected in the area under surveillance, that is, the parking area 21, continues to be tracked in the semi-sensitive region 19 as well. The starting position 24 is transferred, together with a time marker and a direction of motion, to the second analysis module 6, and in this way the tracking is made easier. In addition, unconventional motions in the street area 22, such as wrong-way drivers, are detected and tracked, among other ways by evaluation of the optical flow.

The invention claimed is:

1. A method for detection and tracking of objects in motion (16) in a scene under surveillance (15), in which scene, besides the objects in motion (16), interfering factors (17, 23) comprising interfering objects, interfering regions, or both are included, comprising steps of:
    defining the scene under surveillance (15) as a plurality of regions that are defined as image sections in the scene under surveillance (15) that are stationary over the surveillance period, for each frame in an image sequence of frames derived from the scene under surveillance;
    dividing up the plurality of regions into various region classes, the various region classes including:
        a first region class (D1, 5) with sensitive regions in which no interfering factors (17, 23) or only insignificant interfering factors (17, 23) are located, are expected or are located and expected,
        a second region class (D2, 6) with semi-sensitive regions (19), in which interfering factors (17, 23) are located, are expected, or are located and expected; and
        a third region class (D3) with insensitive regions in which interfering factors (17, 23) comprising blind spots are located;
    performing a sensitive content analysis for detection, for tracking, or both of the objects in motion (16) in the first region class (D1, 5) with sensitive regions; and
    performing a semi-sensitive content analysis for detection, for tracking, or both of the objects in motion (16) in the second region class (D2, 6) with semi-sensitive regions (19), which semi-sensitive content analysis is limited, is modified or both, as compared to the sensitive content analysis;
    wherein no content analysis for detection, for tracking or both of the objects in motion (16) is performed in the third region class (D3) with insensitive regions.

2. The method as defined by claim 1, wherein in one of the semi-sensitive regions (19), objects in motion (16) are detected, are tracked or are detected and tracked that exhibit an unconventional pattern of motion compared to the semi-sensitive regions (19).

3. The method as defined by claim 2, wherein in one of the semi-sensitive regions (19), objects in motion (16) are detected, are tracked or are detected and tracked that move in the semi-sensitive regions (19) counter to a general direction of motion.

4. The method as defined by claim 2, wherein in one of the semi-sensitive regions (19), objects in motion (16) are detected, are tracked or are detected and tracked that in the semi-sensitive regions (19) move with a directional motion in front of a scene area (15) that is non-moving.

5. The method as defined by claim 2, wherein in the semi-sensitive regions (19), objects in motion (16) are detected, are tracked or are detected and tracked by way of analysis of the optical flow.

6. The method as defined by claim 1, wherein in the semi-sensitive regions (19), objects in motion (16) are detected, are tracked or are detected and tracked via a comparison of characteristics of the objects in motion (16) with characteristics of reference objects.

7. The method as defined by claim 6, wherein the reference objects or their characteristics are stored in memory in a reference database (10).

8. The method as defined by claim 1, wherein in the semi-sensitive regions (19), objects in motion (16) are detected, are tracked, are detected and tracked or are further tracked on the basis of any combination of information from the group consisting of motion information, object information, and characteristic information, which information is detected in the sensitive regions (20).

9. An apparatus (1) for performing a method for detection and tracking one or more objects in motion (16) in a scene under surveillance (15), comprising:
    an interface (3) configured for receiving image sequences from the scene under surveillance, in which scene under surveillance, besides the one or more objects in motion (16), interfering factors (17,23) comprising interfering objects, interfering regions, or both are included,
    a classification module (4) configured for defining regions in the scene under surveillance defining the scene under surveillance (15) as a plurality of regions, which regions are defined as image sections in the scene that are stationary over a surveillance period, for each frame in an image sequence of frames derived from the scene and dividing up the regions into various region classes, for each image sequence frame received from the scene under surveillance, wherein a first region class includes sensitive regions (20), within which no significant interfering factors (17, 23) or only insignificant interfering factors (17, 23) are located, are expected or are located and expected, and a second region class includes semi-sensitive regions (19) in which interfering factors (17, 23) are located, are expected or are located and expected and a third region class includes interfering factors comprising blind spots;
    a first analysis module (5) configured for performing a sensitive content analysis for detection, tracking or detection and tracking of the objects in motion (16) in the sensitive regions (20); and
    a second analysis module (6) configured for performing a semi-sensitive content analysis, for detection, for tracking or for detection and tracking of the objects in motion (16) in the semi-sensitive regions (19), which analysis is limited, is modified or both limited and modified compared to the sensitive content analysis;
    wherein the first analysis module (5) and the second analysis module (6) perform no content analysis for detection, for tracking or both of the objects in motion (16) in the third region class with insensitive regions.

10. A computer program having program code means, which program code means is stored in a non-transitory computer-readable medium and performs all the steps of the method for detection and tracking of objects in motion in a scene under surveillance, as set forth in claim 1, when the computer program is executed on a computer or an apparatus.

11. The method for detection and tracking of objects in motion (16) in a scene under surveillance (15), as set forth in claim 1, wherein the step of dividing up the plurality of regions into various region classes is performed manually by a user or in an automated fashion using an image-based, content analysis of the scene under surveillance (15).

12. The method for detection and tracking of objects in motion (16) in a scene under surveillance (15), as set forth in claim 1, wherein the step of sensitive content analysis comprises video content analysis.

13. The method for detection and tracking of objects in motion (16) in a scene under surveillance (15), as set forth in claim 12, wherein the video content analysis includes forming or taking on a scene reference image, segmentation of objects, and detection and/or tracking of the segmented objects over time.

14. The apparatus as set forth in claim 9, wherein the classification module (4) divides up the plurality of regions into various region classes manually by a user or in an automated fashion using an image-based, content analysis of the scene under surveillance (15).

15. The apparatus as set forth in claim 9, wherein the first analysis module (5) implements video content analysis as the sensitive content analysis.

16. The apparatus as set forth in claim 15, wherein the video content analysis includes forming or taking on a scene reference image, segmentation of objects, and detection and/or tracking of the segmented objects over time.

\* \* \* \* \*